United States Patent
Nootenboom

(10) Patent No.: US 8,875,724 B2
(45) Date of Patent: Nov. 4, 2014

(54) MECHANISM FOR ADJUSTING A TELESCOPING MEMBER

(71) Applicant: Jeremy Nootenboom, Asland, OR (US)

(72) Inventor: Jeremy Nootenboom, Asland, OR (US)

( * ) Notice: Subject to any disclaimer, the term of this patent is extended or adjusted under 35 U.S.C. 154(b) by 171 days.

(21) Appl. No.: 13/691,812

(22) Filed: Dec. 2, 2012

(65) Prior Publication Data

US 2014/0150834 A1    Jun. 5, 2014

(51) Int. Cl.
*A45B 3/12* (2006.01)
*F16B 7/14* (2006.01)
*A45B 9/00* (2006.01)

(52) U.S. Cl.
CPC ... *F16B 7/14* (2013.01); *A45B 9/00* (2013.01); *A45B 2009/007* (2013.01)
USPC .............. 135/75; 135/65; 135/69; 403/109.1; 280/823

(58) Field of Classification Search
CPC ........ A47B 9/20; A47B 21/02; A47B 7/1463; A45B 2009/007; A45B 19/04; A45B 9/04; A45B 3/12; F16M 11/26; A63C 11/22; A63C 11/221; A61H 3/00
USPC ........... 135/65, 69, 75; 280/819, 823; 482/76; 248/188.5, 155, 157; 403/109.1–109.5, 403/109.8, 109.7
See application file for complete search history.

(56) References Cited

U.S. PATENT DOCUMENTS

| | | | | |
|---|---|---|---|---|
| 2,960,095 | A | * | 11/1960 | Smith, Jr. ......................... 135/68 |
| 4,324,502 | A | | 4/1982 | Pickles |
| 5,036,873 | A | * | 8/1991 | Clayton .......................... 135/69 |
| 5,163,650 | A | | 11/1992 | Adams et al. |
| 5,181,782 | A | | 1/1993 | Wojcik |
| 5,363,727 | A | | 11/1994 | Barth et al. |
| 5,522,615 | A | * | 6/1996 | Kazmark et al. .............. 280/655 |
| 5,651,565 | A | | 7/1997 | Liu |
| 5,669,103 | A | | 9/1997 | Hui |
| 6,595,226 | B2 | * | 7/2003 | Uemura .......................... 135/75 |
| 6,782,903 | B1 | * | 8/2004 | Jarman et al. ................... 135/75 |
| 6,862,776 | B2 | * | 3/2005 | Chen ............................ 16/113.1 |
| 7,845,602 | B1 | * | 12/2010 | Young et al. ............... 248/125.8 |
| 8,215,863 | B2 | * | 7/2012 | Sohn .......................... 403/109.5 |
| 8,397,737 | B2 | * | 3/2013 | Evans et al. ..................... 135/65 |
| 8,500,357 | B2 | * | 8/2013 | Stahle ........................ 403/109.7 |
| 2006/0078368 | A1 | * | 4/2006 | Wang ......................... 403/109.1 |
| 2010/0254751 | A1 | | 10/2010 | McMillan, III |

* cited by examiner

*Primary Examiner* — Winnie Yip
(74) *Attorney, Agent, or Firm* — Peter A Haas Esquire LLC

(57) ABSTRACT

In one embodiment, the present invention contemplates an improved mechanism for adjusting a telescoping member. The telescoping member includes at least two sections including a first pole member having an outer diameter and an inner diameter; and a second pole member having a second pole inner diameter larger than the first pole outer diameter; a collet having a top portion securely coupled to the inner diameter arranged on a lower portion of the first pole member and a bottom portion extending beyond a lower end of the first pole member, the collet further comprising an external thread; and a handle member arranged on top of the first pole member, the handle member comprising an actuator button coupled to an internal spring coupled to a rod extending through the first pole member, the rod terminating in a plunger end, the plunger end extending through the collet.

9 Claims, 5 Drawing Sheets

MECHANISM FOR ADJUSTING A TELESCOPING MEMBER

PRIORITY CLAIM

The present application claims benefit under 35 USC Section 119(e) of U.S. Provisional Patent Application Ser. No. 61/556,527 filed on 2011 Dec. 1: The present application is based on and claims priority from this applications, the disclosure of which is hereby expressly incorporated herein by reference.

BACKGROUND

This invention relates to an improved mechanism for locking and releasing a telescoping member and more specifically relates to an improved trekking pole.

The general concept of extending a cylindrical rod by using a series of concentrically nested hollow members to provide a retracted position of a shortened length and an extended second length that is adjustable between the shortened length and a fully extended length is well studied in this art. However, in the art the locking mechanism to adjust one telescoping member relative to another has not satisfactorily provided a quick, lightweight, and secure means for such and, accordingly, improvement is needed.

As background, such attempts at providing locking mechanisms for telescoping members include a locking mechanism for telescoping tubing described by Pickles in U.S. Pat. No. 4,324,502 issued on 1982 Apr. 13. Therein Pickles teaches a concentric plug having a collar. The plug fits snugly in the end of the inside tube and is fixed against rotation by means of a transverse pin that extends through the inside tube, but is flush with its outside surface. The locking mechanism includes a short cylinder that has an outside diameter about the same as the outside diameter of the inside tube. This plug includes a peripheral groove that receives an o-ring that creates a friction fit between the plug and the inside wall of the larger diameter tube. Thus, at any given position where it is desired to lock the two tubes together in a fixed longitudinal position, the inner tube is rotated on its axis relative to the outer tube, which in turn causes a wedging action of the o-ring and plug relative the inside wall. This approach, however, has limitations in that the amount of frictional force of the o-ring and plug can easily be overcome under normal use both from degradation of the o-ring over time and because the surface area of the o-ring in contact with the inside wall is not sufficient to support the pressures exerted on the pole when used as a trekking pole.

Another type of telescoping concentric members includes a mast type device such as a telescoping mast with improved holddown-locking mechanism taught by Adams et al. in U.S. Pat. No. 5,163,650 issued on 1992 Nov. 17. Adams et al. teaches an improved locking system that includes a lock bar near the lower end of each lower section, a locking assembly on the upper end of each intermediate section, and a lock actuator stud on the upper ends of each of the intermediate and bottom sections. The lock assembly includes an inwardly projecting collar and a rotatable disk. The lock actuator stud and lock disk have mating engagable cam surfaces. Finally, a splined spring loaded nut carried by each mast sections engages a multiple lead axial screw to extend and retract the telescoping mast sections. One limitation of this device includes a reliance on rotating sections of mast and a screw drive for extending those sections: This adds complexity and in turn, makes such a device costly to build, maintain, and repair. Additionally, while the mechanism described by Adams et al. is suited for supporting adjacent telescoping sections from retracting unexpectedly, it is poorly suited for supporting additional weight that might be placed on the end of the upper most telescoping member, for example if the mast were used to support the weight of a person hiking, or supporting the weight of a light, a camera, microphone, and such.

Another adjustable length telescoping member is described by Liu in U.S. Pat. No. 5,651,565 issued on 1997 Jul. 29. Liu teaches an outer tube member and an inner tube member slidable inside the outer tube. An expansion member arranges within the outer tube member and consists of at least two tapered members each having innermost and outer most portions. The expansion member also carries an outer tube pressure member shaped to wedge between the expansion member an an inner surface of the outer tube. Liu teaches that pressure between (caused by friction) the inner surface of the outer tube and the expansion member is sufficient to hold the outer tube in relative position to the inner tube. However, as many experienced mountaineers, skiers, backpackers, and back-country explorers can attest, this friction hold device does not adequately hold the relative position of the inner and outer tubes when placed in use to support the weight of an uphill walker or climber, or a gear-laden user.

Yet another telescoping pole system is described by McMillan, III in U.S. Published Application No. 2010/0254751 published on 2010 Oct. 7. McMillan, III teaches a pole system having a first and second pole and a deforming member with a retaining element. The retaining element deforms when the user exerts pressure by means of a control button connected to a spring mechanism. The retaining element deforms, or flattens, thus dis-engaging the retaining element from a mating element in the pole piece. The McMillan, III system improves over the common friction fit adjusting mechanism common in the art by providing a rudimentary mechanical lock. Yet, improvements over McMillan are still needed to provide a more simple system, that is more robust and provides greater mechanical interlock than taught by McMillan, III.

Other known locking and adjusting mechanisms are known in the art, but bear little relevance to the current invention. Such teachings include an integrated handle for telescoping tubes as described by Hui in U.S. Pat. No. 5,669,102 issued on 1997 Jul. 23; a telescopic hand tool with locking mechanism described by Bart et al. in U.S. Pat. No. 5,363,727 issued on 1994 Nov. 15; and a telescoping rail with locking mechanism described by Wojcik in U.S. Pat. No. 5,181,782 issued on 1993 Jan. 26.

DRAWING

DESCRIPTION OF THE INVENTION

Figure 1:
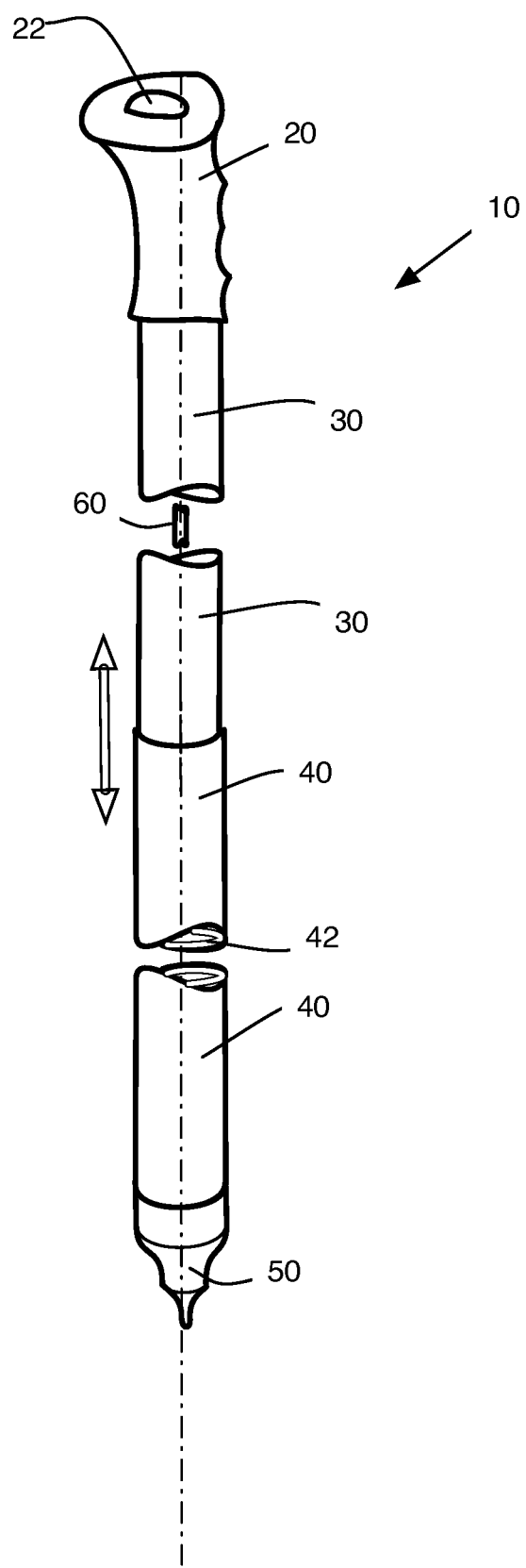
FIG. 1 is a front view of a system including a telescoping member having an improved mechanism for adjusting the telescoping member.

Possible embodiments will now be described with reference to the drawings and those skilled in the art will understand that alternative configurations and combinations of components may be substituted without subtracting from the invention. Also, in some figures certain components are omitted to more clearly illustrate the invention.

An improved mechanism for a telescoping pole system, operated by a user to adjust a length of the telescoping pole to nearly any length from a length slightly longer than one telescoping member to a second length slightly shorter than the combined length of the two members, includes an improved mechanical interlock system. Further, although many of the disclosed embodiments are described in the context of a telescoping pole system for a hiking pole, it will be appreciated that such disclosed elements and features may be applicable to telescoping pole systems implemented in other contexts including, for example, ski poles, Nordic walking poles, wading staffs, fishing poles, measuring sticks, camera supports, tripod legs, Rifle rests or supports, chair legs, stool legs, table legs, reaching poles, ladder legs or supports, canes, crutches, walker legs, vehicle roof racks, strollers, luggage, etc. Hence, while a disclosed embodiment of the telescoping pole system includes an ambulatory aid implementation, it will be appreciated that other implementations of the disclosed telescoping pole system may be utilized, particularly where rapid and/or convenient adjustment of pole length or height is desired.

The improved mechanism for a telescoping pole system includes, at least, a first pole member and a second pole member, these pole members ideally are a cylindrical and hollow tube member formed from extruded aluminum and the first pole member nests inside the second pole member, as would be well understood in the art. Other shapes of the nesting pole members are also contemplated including circular, ovular, square, rectangular, among others, for example. Other materials and combinations of materials would work equally well for many of the various components of the invention. Contemplated materials include aluminum and its alloys, carbon fiber, polymers, stainless steel, etc., depending on final use of the device. For example, as a trekking pole, aluminum is a good choice of material, but as a tripod for a camera, plastic or aluminum may work equally well, and those skilled in the art will appreciate that the material choice would depend on the application of the device. The material used for manufacture will be dictated by the intended purpose of the mechanism with respect to weight and strength required. A camera mount calls for different materials than a car jack.

One contemplated embodiment for use as a trekking pole and the like consists of aluminum for the telescoping member, such as a 6061-T6-grade aluminum. The collets are machined out of round spring stock steel. The actuator rod is a threaded rod. The telescoping members can be made from aluminum, steel, carbon fiber, plastic, and/or stainless steel. The actuator rod can be made with aluminum, steel, brass, or it can be a piece of stainless woven wire or a single strand of wire similar to piano wire. The actuator (plunger/cone-shaped piece) is currently made with steel, but can be made with aluminum, brass, nylon or any other material able to be machined.

The present invention in its various contemplated embodiments provides several advantages over the known art. The invention allows the user to hold the pole at the desired height and press the actuator button to allow the pole to extend to the desired length. This is particularly useful when used on any adjustable pole where it is time consuming to continually adjust the pole length. Like a tripod that holds a transit on an uneven surface or a bipod support on a hunting rifle. On the above example the device is held in the desired position and actuated then the legs fall to the correct length. When the actuator is released the item is locked in place and ready to use. When sizing ski poles it is best practice to place your arms out in front of you. The distance of your hand to the floor is the recommended length of the ski pole. With my pole you hold the handle at the desired height and actuate the mechanism to adjust it to the ideal length. Essentially this adjustment mechanism provides an easier, more reliable adjustment feature than other adjustable poles of any sort currently.

FIG. 1 shows an overview of the system 10 of the present invention. A telescoping pole assembly 10 includes an improved telescoping locking system, which includes a handle 20 having an actuator button 22. The actuator button is placed on top of the handle, however in alternative embodiments the actuator button 22 could be located wherever it is convenient to place such a button including a trigger-style button or lever for the index finger and such. The handle 20 naturally covers the top end of the first pole member 30 as would be well-understood in this art. The first pole member 30 is a hollow cylindrical member having an outer diameter that is slightly smaller than the inner diameter of the second pole member 40 so that the first pole member slideably nests within the second pole member, again, as well understood in this art.

The second pole member 40 arranges adjacent to the first pole member at an end opposite the handle 20. And, the second pole member 40 terminates with a tip 50. The tip may be a carbon fiber tip, steel tip, rubber tip, or any other tip as would be typical to terminate a trekking pole or other contemplated use as previously discussed, above. The second pole member is of the same configuration of the first pole member and includes a hollow cylinder with an inner diameter slightly larger than the outer diameter of the first pole member. The second pole member 40 also includes an internal thread 42 for its entire length. The thread depth and pitch will vary with the intended use. A use that requires little precision will use a coarse thread pitch. If a more precise adjustment is required, a fine thread pitch will be used. The depth of the threads will also vary with the material used. On our aluminum pole the thread depth is equal to one half the material thickness of 0.058" (0.029). Of course, a plurality of generally parallel grooves in lieu of threads may be used, and would work as well for the device of the invention, but may be more difficult to manufacture.

Figure 2:
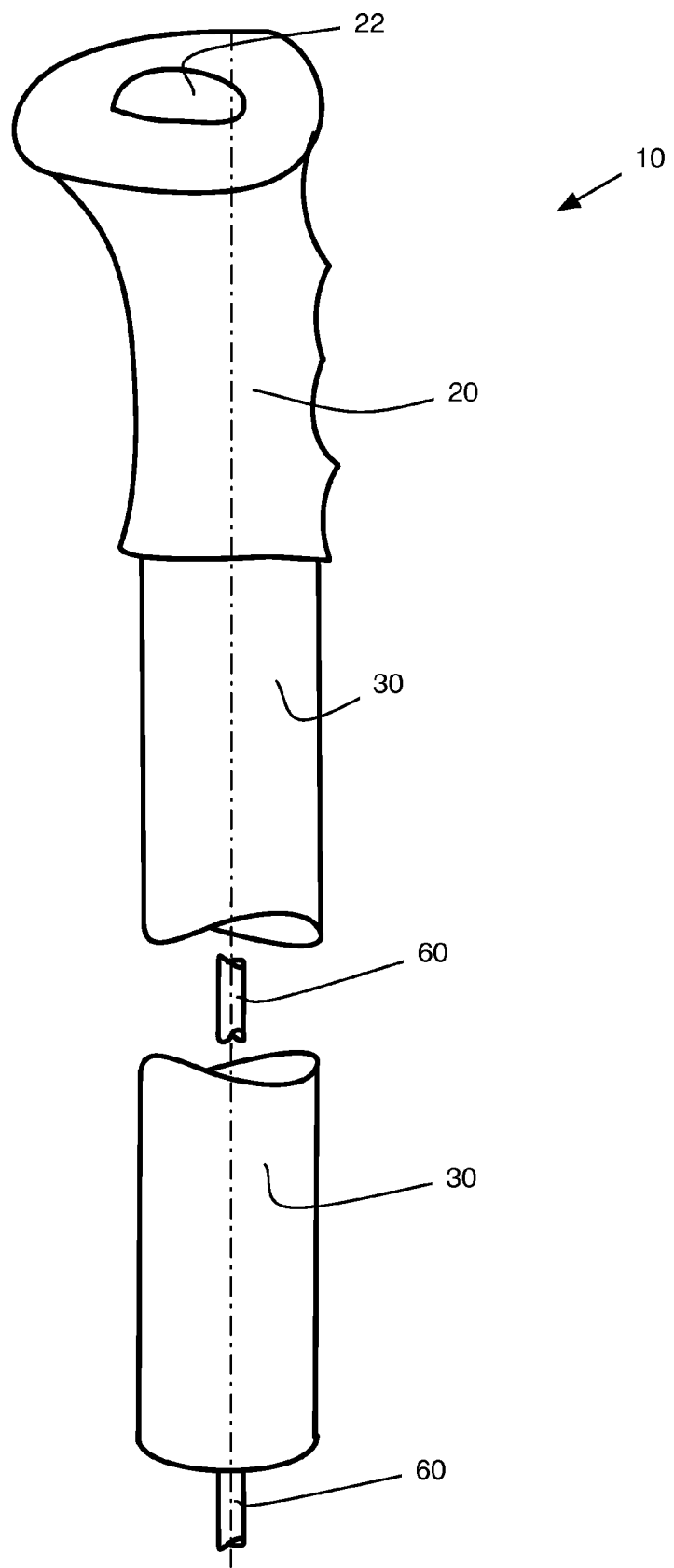
FIG. 2 is a partial front view of an upper portion of the system of FIG. 1.
Figure 3:
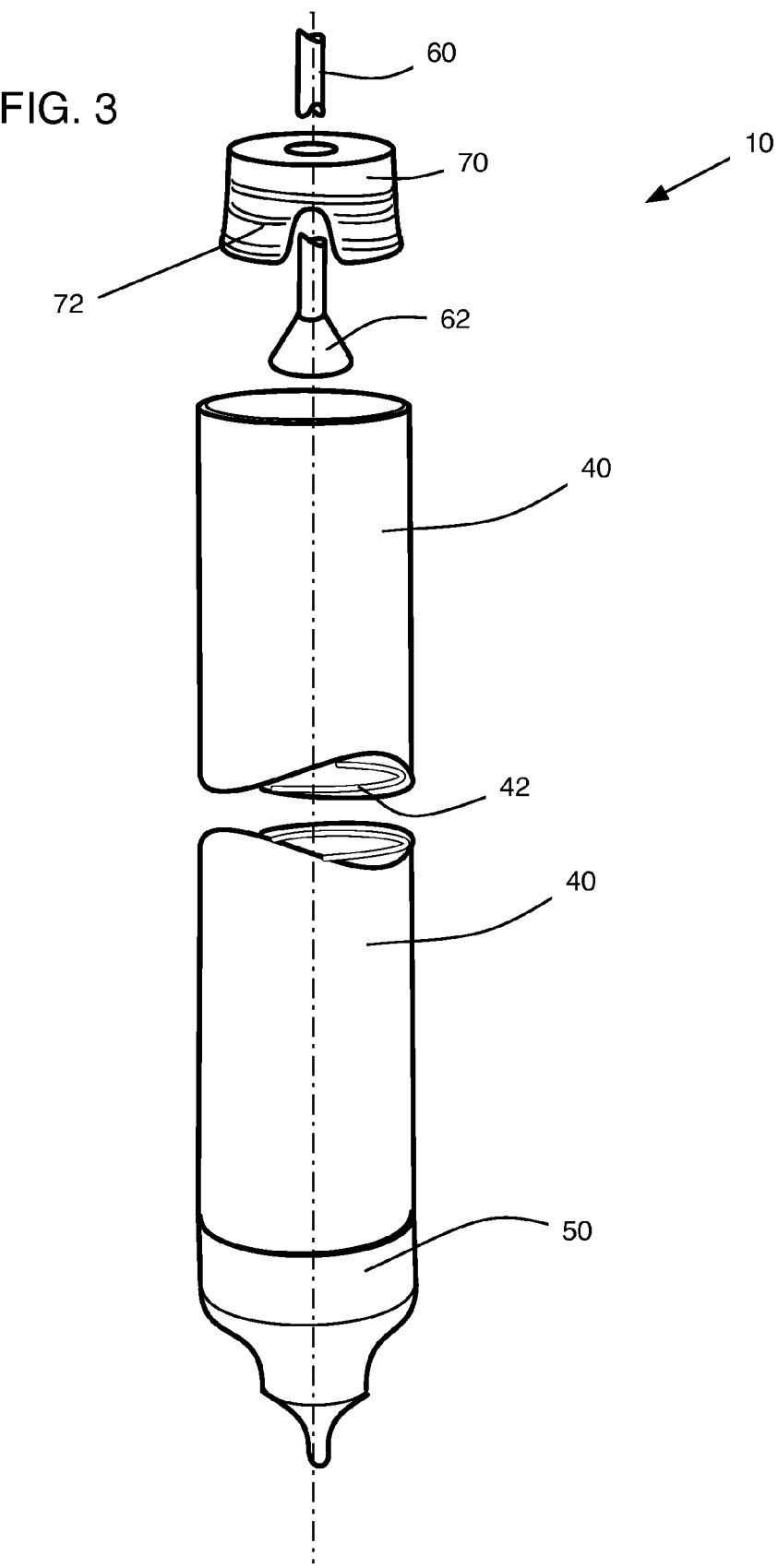
FIG. 3 is a partial front view of a lower portion of the system of FIG. 1.

FIGS. 2 and 3 are an exploded frontal view of the system 10 of FIG. 1, for example. For convenience, the sheets of FIGS. 2 and 3 should be arranged so that FIG. 2 appears above FIG. 3 to arrange the components as in a tall vertical column. In addition to the components already discussed with reference to FIG. 1, FIGS. 2 and 3 more clearly show an internal rod 60 extending from the handle through the length of the first pole 30. The rod terminates in a plunger 62 at its distal end (defined away from the handle and adjacent to the second pole member 40). This rod 60 is constructed of threaded steel, for example, but alternatively this can be a cable constructed of galvanized steel wire.

The rod/cable member 60 supports a collet 70 having an external thread 72. A top portion of the collet securely fits inside the first pole member 30. But its lower portion extends below the first pole member to insert inside the second pole member 40. A notch on a portion of the collet enables the collet to contract and expend depending on where the plunger 62 is. The plunger, when inside the collet, forces the sidewalls of the collet outward. This, in turn, causes the external collet threads 72 to mechanically interlock with corresponding internal threads 42 of the second pole member 40.

Because the second pole member 40 includes an internal thread running its entire length, there is now nearly an infinite number of positions where the collet can engage mechanical the lower member 40. A suitable thread pitch, length and size is $5/8^{th} \times 18$ pitch however a myriad of thread sizes would work as well, as long as the collet's external thread can engage it.

Figure 4:
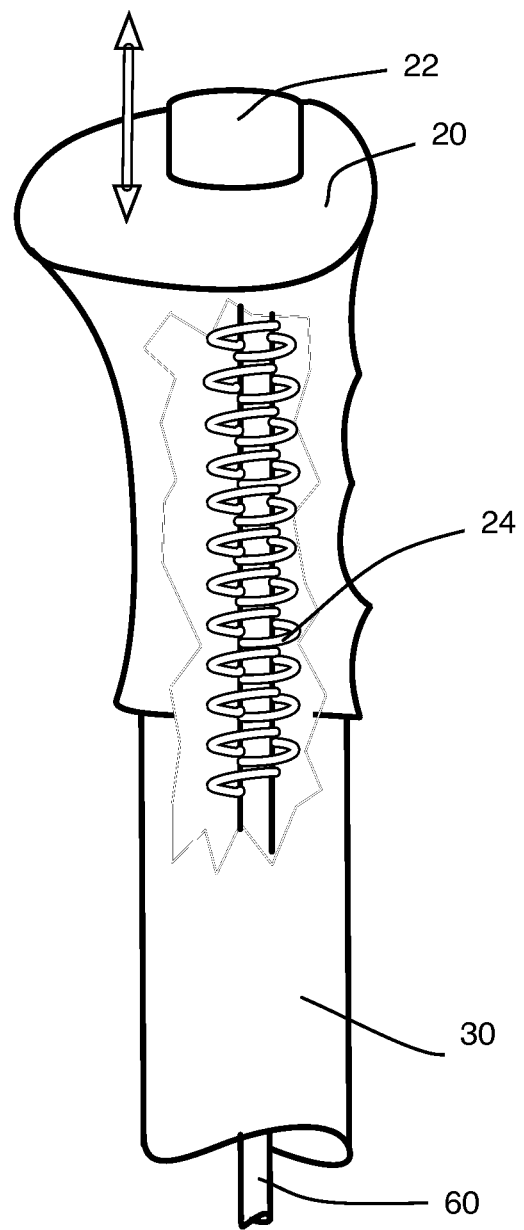
FIG. 4 is a partial cross-sectional frontal view of the system of FIG. 2.

To facilitate manipulation of the rod 60, the handle 20 includes an actuator button 22. As FIG. 4 shows, the handle also includes an internally mounted, vertically positioned spring mechanism 24 to pull the plunger. The spring force required to engage the collet depends on the collet material. We can adjust the flexibility of the collet to allow for comfortable release pressure. We are currently using a spring that is about ½ inch wide by about 3 inches long.

In an alternative contemplated embodiment, a rod and cable member 60, as previously discussed, is adapted to fit securing inside a first pole member 30 and a lower portion of the collet member extends below the first pole member to insert inside a second pole member 40, as previously discussed. The second pole member, in lieu of an internal thread, includes an internal groove or notch, or preferably, a plurality of generally parallel notches or grooves extending for at least a partial circumference of an inner wall of the second telescoping member. The spacing of the grooves can be close or far apart, depending on the number of discrete locking locations desired for adjustment of the effective length of the cooperating segments of the telescoping member. This departs from the first preferred embodiment's internal thread, which provides effectively a limitless amount of adjustment. However, it is contemplated that discrete intervals of adjustment may work better in different applications, and or may be more economical to produce.

In yet another contemplated embodiment, the second telescoping member 40 includes at least one, or preferably, a plurality of horizontally aligned through-hole slot members arranged around at least a part of the circumference of the member.

Figure 5:
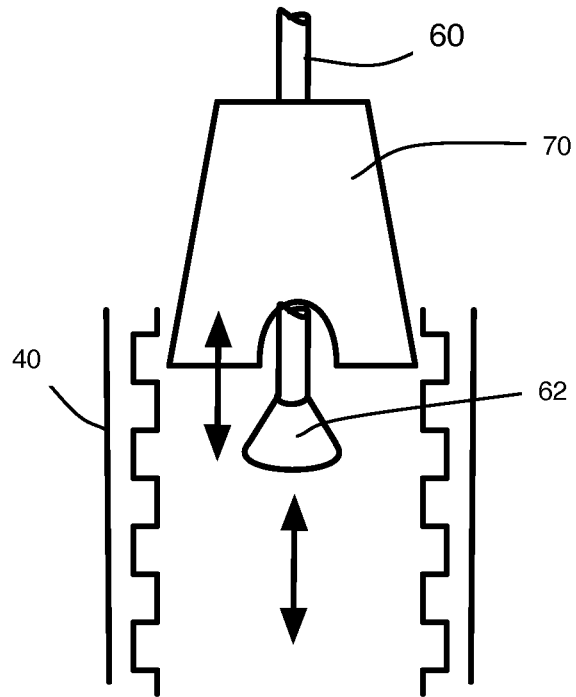
FIG. 5 is a partial cross sectional frontal view of the second telescoping member having an internal thread or grooves relative to the collet with the plunger extended according to preferred embodiment of the present invention.
Figure 6:
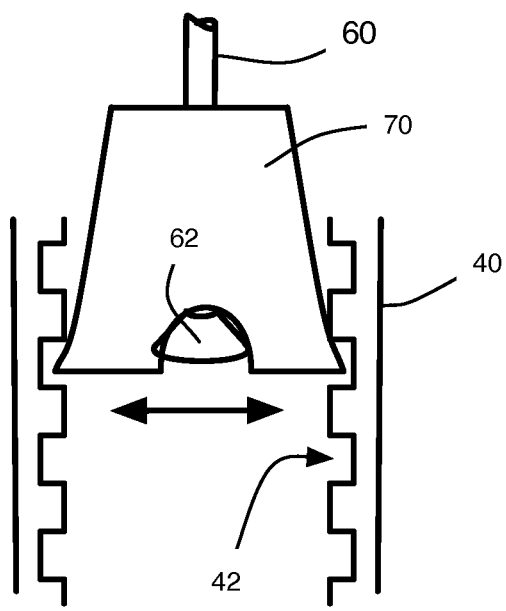
FIG. 6 is a partial cross sectional frontal view of the embodiment of FIG. 5 with the collet locked in a groove or thread of the second telescoping member with the plunger in the retracted (normal) position inside the collet.

FIG. 5 illustrates the collet 70 inside the second telescoping member 40. The segment 40 includes an internal groove or channel or thread 42. When the actuator button on the handle is depressed, which causes the spring to compress, the plunger 62 exits or retracts from the collet 70, allowing the collet to travel vertically up and down inside the shaft. FIG. 6 illustrates the plunger 62 retracted inside the collet 70, which is the normal position, as it represents the spring being in its normal state and the actuator button on the handle not being depressed. Accordingly, the plunger 62 in this resting position forces the collet's sidewalls to extend outward, engaging the channel or groove or thread 42 preventing relative vertical movement up and down between the first and second segments of the telescoping member.

Although the invention has been particularly shown and described with reference to certain embodiments, it will be understood by those skilled in the art that various changes in form and detail may be made without departing from the spirit and scope of the invention.

I claim:

1. An improved mechanism for adjusting a telescoping member, the improved mechanism comprising:
a first pole member comprising an outer diameter and an inner diameter;
a collet comprising a top portion securely coupled to the inner diameter of the first pole member, the collet further arranged on a lower portion of the first pole member and the collet comprising a bottom portion extending beyond a lower end of the first pole member, the collet further comprising at least one external thread;
a second pole member having a second pole inner diameter larger than the first pole outer diameter and the second pole inner diameter further comprising a plurality of generally parallel internal grooves adapted to selectively engage the collet's at least one external thread and whereby the second pole member is selectively adapted to slide over the first pole member; and
a rod extending through the first pole member, the rod terminating in a plunger end, the plunger end extending through the collet and adapted to selectively engage and release the collet.

2. The mechanism of claim 1 further comprising:
a handle member arranged on top of the first pole member, the handle member comprising an actuator button coupled to an internal spring coupled to the rod.

3. The mechanism of claim 1 wherein:
the at least one external thread of the collet further comprises plurality of generally parallel grooves.

4. The mechanism of claim 1 further comprising:
the second pole member's plurality of generally parallel internal grooves comprises at least one continuous internal thread adapted to be selectively engaged by the collet's at least one external thread.

5. The improved mechanism of claim 1 wherein: the first pole member and the second pole member cooperate and adapt for use as any at least one of the following; a ski pole, a trekking pole, or a hiking pole.

6. The mechanism of claim 1 further comprising:
a tip adapted to couple to a distal end of the second pole member.

7. The mechanism of claim 1 wherein:
the second pole member comprises at least one sidewall.

8. The mechanism of claim 1 wherein:
the second pole member comprises at least one body segment.

9. An improved mechanism for adjusting a telescoping member used on a hiking or trekking pole, the improved mechanism comprising:
a first pole member comprising an outer diameter and an inner diameter;
a collet comprising a top portion securely coupled to the inner diameter of the first pole member, the collet further arranged on a lower portion of the first pole member and the collet comprising a bottom portion extending beyond a lower end of the first pole member, the collet further comprising at least one external thread;
a second pole member having a second pole inner diameter larger than the first pole outer diameter and the second pole inner diameter further comprising an internal groove adapted to selectively engage the collet external thread and whereby the second pole member is selectively adapted to slide over the first pole member; and
a handle member arranged on top of the first pole member, the handle member comprising an actuator button coupled to an internal spring coupled to a rod extending through the first pole member, the rod terminating in a plunger end, the plunger end extending through the collet and adapted to selectively engage and release the collet.

* * * * *